(12) United States Patent
Tseng et al.

(10) Patent No.: US 9,667,055 B2
(45) Date of Patent: May 30, 2017

(54) OVER-VOLTAGE PROTECTION APPARATUS AND METHOD OF OPERATING THE SAME

(71) Applicant: DELTA ELECTRONICS, INC., Taoyuan County (TW)

(72) Inventors: Yu-Chieh Tseng, Taoyuan County (TW); Chien-Chung Lee, Taoyuan County (TW); Chia-Hao Yeh, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 346 days.

(21) Appl. No.: 14/632,634

(22) Filed: Feb. 26, 2015

(65) Prior Publication Data

US 2016/0164273 A1 Jun. 9, 2016

(30) Foreign Application Priority Data

Dec. 5, 2014 (TW) .............................. 103142272 A

(51) Int. Cl.
*H02H 3/20* (2006.01)
*H02H 9/04* (2006.01)
*H02M 7/04* (2006.01)

(52) U.S. Cl.
CPC ..................... *H02H 3/20* (2013.01)

(58) Field of Classification Search
CPC ....................................................... H02H 3/20
USPC ............................................................ 361/18
See application file for complete search history.

(56) References Cited

U.S. PATENT DOCUMENTS

2009/0152950 A1* 6/2009 Zhang .................. H02H 7/1213
307/43

\* cited by examiner

*Primary Examiner* — Thienvu Tran
*Assistant Examiner* — Kevin J Comber
(74) *Attorney, Agent, or Firm* — Hauptman Ham, LLP

(57) ABSTRACT

An over-voltage protection apparatus includes an input voltage detection module (12) and a second switch (14). The input voltage detection module (12) includes a switch assembly (121), a rectifying circuit (122), a voltage detection circuit (123), and a voltage protection circuit (124). The rectifying circuit (122) rectifies an AC power source (Vac) to generate a DC voltage (Vb). The voltage protection circuit (124) controls the second switch (14) to disconnect the AC power source (Vac) to supply a load (90) when the voltage detection circuit (123) detects that the DC voltage (Vb) reaches to a first over voltage value (Voth1). The voltage protection circuit (124) controls the switch assembly (121), thereby providing a voltage-limiting protection and a current-limiting protection when the voltage detection circuit (123) detects that the DC voltage (Vb) reaches to a second over voltage value (Voth2).

19 Claims, 7 Drawing Sheets

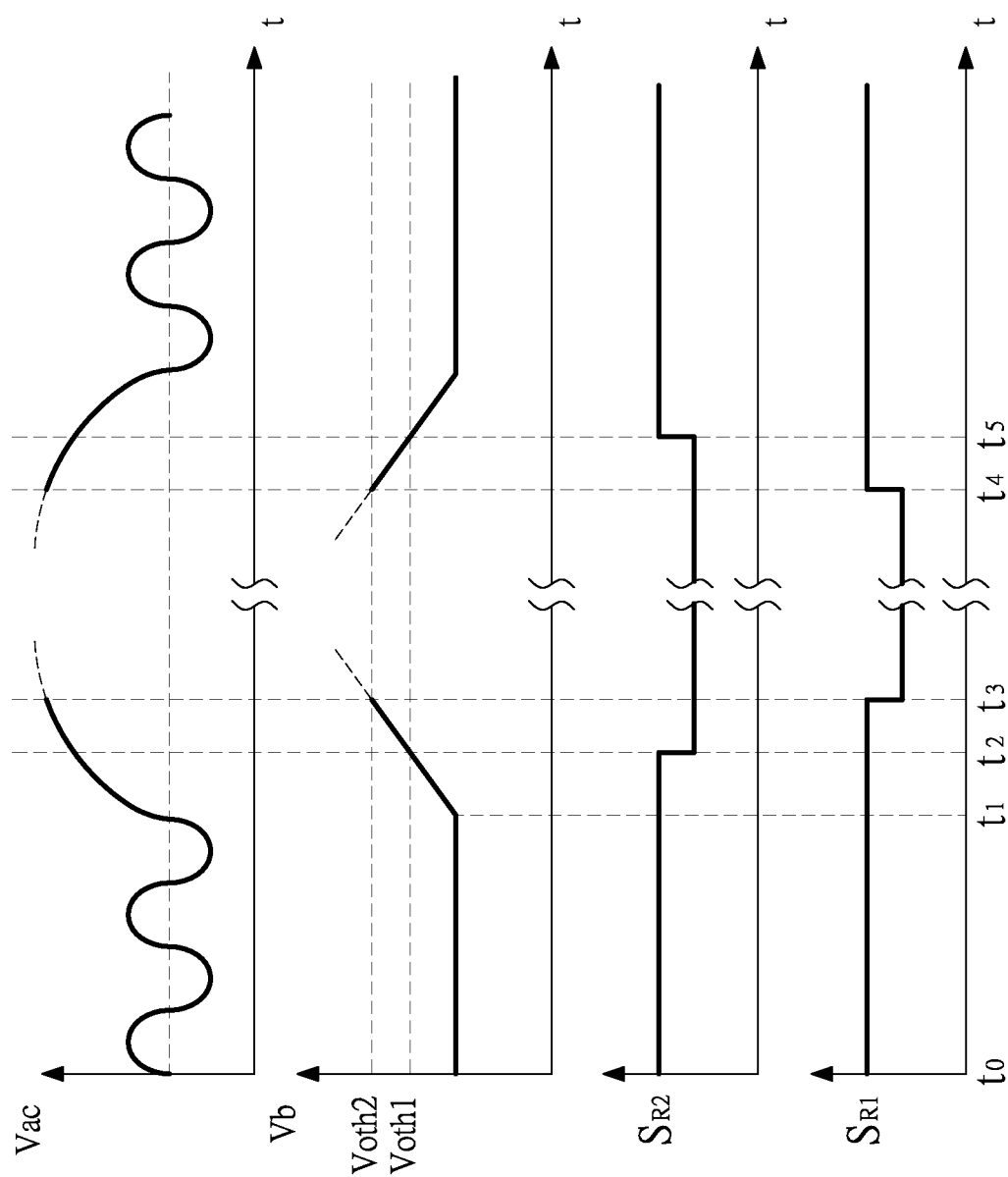

OVER-VOLTAGE PROTECTION APPARATUS AND METHOD OF OPERATING THE SAME

BACKGROUND

1. Technical Field

The present disclosure generally relates to an over-voltage protection apparatus and a method of operating the same, and more particularly to an over-voltage protection apparatus and a method of operating the same are provided to disconnect an AC power source to supply a load by controlling a relay switch when the AC power source abnormally supplies power.

2. Description of Related Art

The abnormal high voltage of the utility power source is may damage electronic components of the household appliance product, and even damage the personal safety and property.

The currently available abnormal voltage detection and protection apparatus includes an abnormal voltage detection circuit and a relay switch circuit. Reference is made to FIG. 1 which is a circuit block diagram of the related-art abnormal voltage detection and protection apparatus. In order to avoid the abnormal voltage affecting the rear-end conversion circuit and the load 20A, the abnormal voltage detection circuit 10A is provided to turn off the relay switch 30A to disconnect the abnormal AC power source Vac supplying power to the load 20A.

In addition, the withstand voltage class and the rated power of the resistor inside the relay switch circuit are related to the electric power, and also the high withstand-voltage resistor and the large current-withstand relay are used to implement the abnormal power source protection. As a result, it is unable to meet the demand for miniaturization. For the existing household or commercial electrical apparatuses, such as the air conditioner or the washing machine, additional over-voltage protection devices have to be used to avoid damaging the driving boards inside the electrical apparatuses once the high-voltage AC power source is suddenly disconnected. Also, the driving boards can be normally used when the AC power source recovers to supply power.

Accordingly, it is desirable to provide an over-voltage protection apparatus and a method of operating the same to provide the over-voltage protection and the voltage-limiting and current-limiting protections by directly controlling switch elements.

SUMMARY

An object of the present disclosure is to provide an over-voltage protection apparatus to solve the above-mentioned problems. Accordingly, the over-voltage protection apparatus is connected to an AC power source and a load. The over-voltage protection apparatus includes an input voltage detection module and a second switch. The input voltage detection module includes a switch assembly, a rectifying circuit, a voltage detection circuit, and a voltage detection circuit. The switch assembly is connected to one terminal of the AC power source. The rectifying circuit is connected to the other terminal of the AC power source and the switch assembly, and to receive the AC power source and rectify the AC power source to generate a DC voltage. The voltage detection circuit receives the DC voltage and outputs a voltage signal. The voltage protection circuit receives the voltage signal and outputs a first switch signal and a second switch signal. The second switch is connected to the AC power source, the load, and the input voltage detection module. The second switch signal controls the second switch to disconnect the AC power source supplying power to the load when the voltage detection circuit detects that the DC voltage reaches to a first over voltage value. The first switch signal controls the switch assembly to provide a voltage-limiting protection and a current-limiting protection when the voltage detection circuit detects that the DC voltage increases to reach to a second over voltage value.

Another object of the present disclosure is to provide a method of operating an over-voltage protection apparatus to solve the above-mentioned problems. Accordingly, the over-voltage protection apparatus is connected to an AC power source and a load. The method includes following steps: (a) providing an input voltage detection module to receive the AC power source and rectify the AC power source to generate a DC voltage, and outputting a first switch signal and a second switch signal; (b) providing a switch assembly and a second switch; (c) controlling the second switch by the second switch signal to disconnect the AC power source supplying power to the load when the voltage detection circuit detects that the DC voltage reaches to a first over voltage value; and (d) controlling the switch assembly by the first switch signal to provide a voltage-limiting protection and a current-limiting protection when the voltage detection circuit detects that the DC voltage continuously increases to reach to a second over voltage value.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

FIG. 5 is a schematic waveform of operating the over-voltage protection according to the present disclosure.

DETAILED DESCRIPTION

Figure 2:
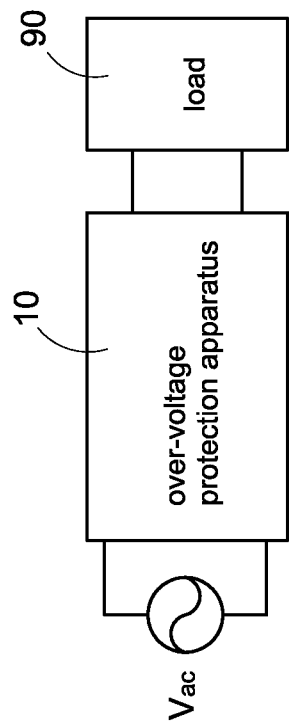
FIG. 2 is a schematic block diagram of an over-voltage protection apparatus applied to an AC power source and a load according to the present disclosure.
Figure 1:
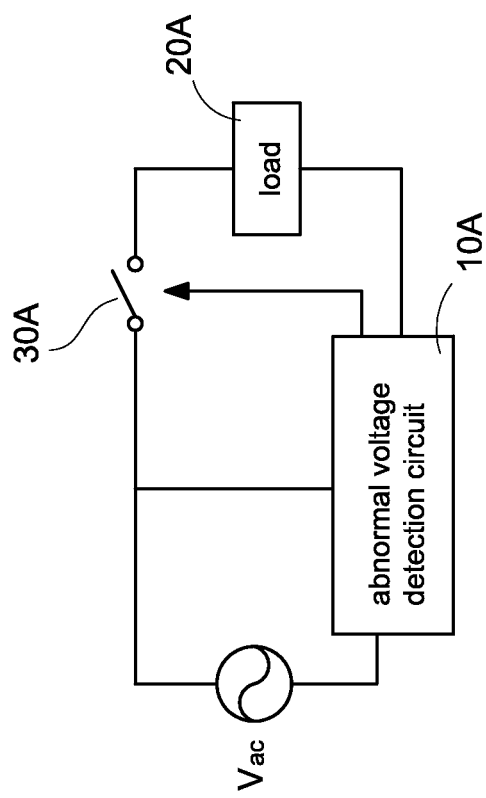
FIG. 1 is a circuit block diagram of the related-art abnormal voltage detection and protection apparatus.

Reference will now be made to the drawing figures to describe the present disclosure in detail.

Reference is made to FIG. 2 which is a schematic block diagram of an over-voltage protection apparatus applied to an AC power source and a load according to the present disclosure. The over-voltage protection apparatus 10 is connected between an AC power source Vac and a load 90 for detecting the power-supplying conditions of the AC power source Vac. In particular, the over-voltage protection apparatus 10 disconnects the AC power source Vac supplying power to the load 90 when the AC power source Vac is in an abnormal condition, such as an over-voltage power supplying condition.

Figure 3:
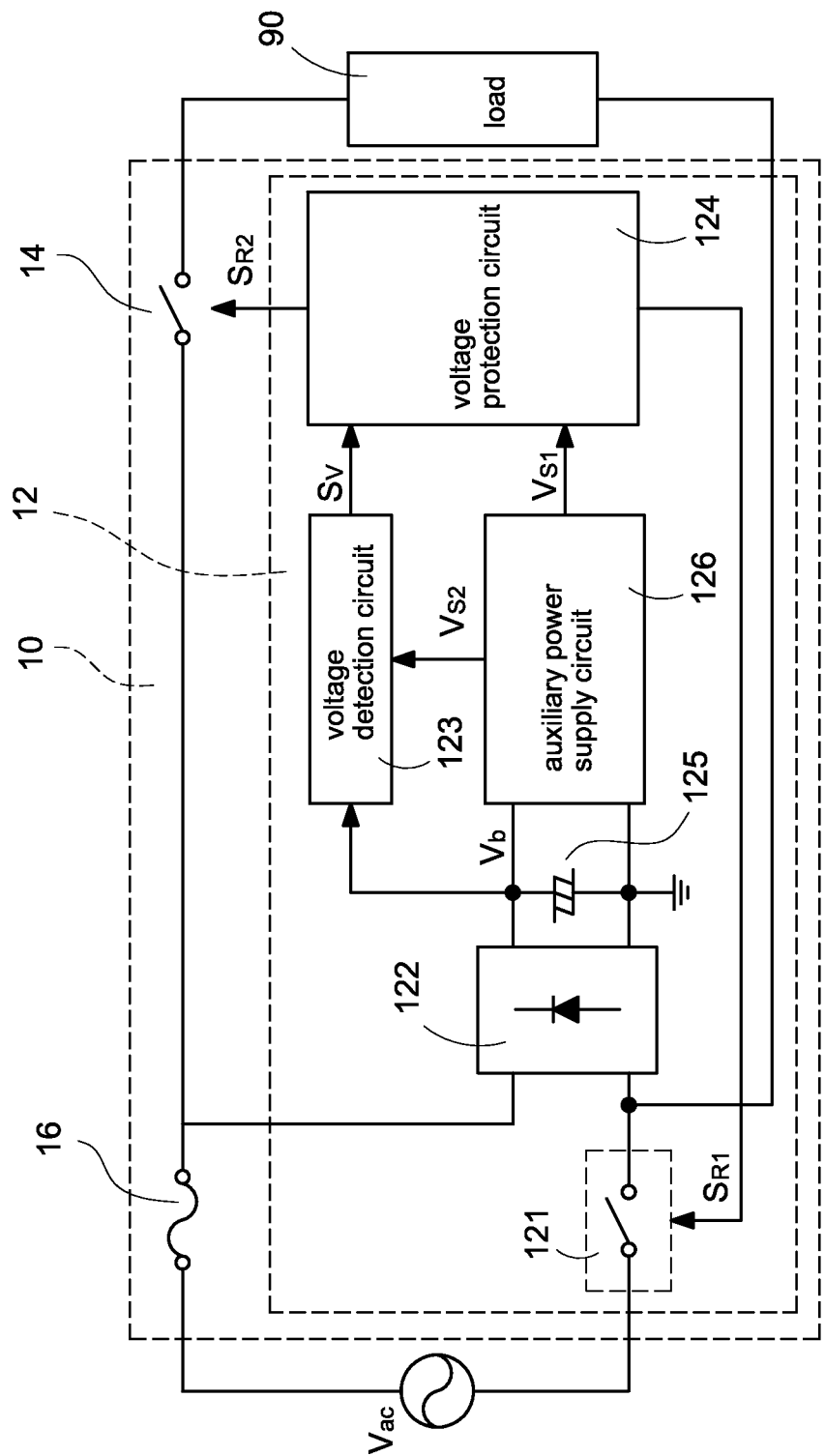
FIG. 3 is a circuit block diagram of the over-voltage protection apparatus according to the present disclosure.

Reference is made to FIG. 3 which is a circuit block diagram of the over-voltage protection apparatus according to the present disclosure. The over-voltage protection apparatus 10 includes an input voltage detection module 12, a second switch 14, and a fuse unit 16. The second switch 14 is connected in series to the fuse unit 16 to form a series branch, and the series branch is electrically connected between the AC power source Vac and the load 90. The fuse unit is used to interrupt excessive current flowing through the series branch when the AC power source Vac supplies power to the load 90. In addition, the second switch 14 is further electrically connected to the input voltage detection module 12. In particular, the second switch 14 can be a relay switch, but not limited.

The input voltage detection module 12 includes a switch assembly 121, a rectifying circuit 122, a voltage detection circuit 123, a voltage protection circuit 124, a main capacitor 125, and an auxiliary power supply circuit 126. An input terminal of the switch assembly 121 is connected to one terminal of the AC power source Vac. An input terminal of the rectifying circuit 122 is connected to the other terminal of the AC power source Vac and the switch assembly 121 to receive the AC power source Vac and rectify the AC power source Vac to generate a DC voltage Vb. The main capacitor 125 is connected in parallel to an output terminal of the rectifying circuit 122 to filter the DC voltage Vb. In other words, a voltage across the main capacitor 125 is equal to the DC voltage Vb. The auxiliary power supply circuit 126 is electrically connected to the main capacitor 125 to receive the filtered DC voltage Vb and converter the filtered DC voltage Vb into a plurality of output DC voltages, such as +12 volts, +5 volts, and so on, for providing the required power of circuits inside the input voltage detection module 12. In this embodiment, the auxiliary power supply circuit 126 outputs a first voltage Vs1 and a second voltage Vs2; the first voltage Vs1 is provided to supply power to the voltage protection circuit 124 and the second voltage Vs2 is provided to supply power to the voltage detection circuit 123.

The voltage detection circuit 123 receives the voltage across the main capacitor 125, namely the DC voltage Vb to output a voltage signal Sv. The voltage protection circuit 124 receives the voltage signal Sv to output a first switch signal $S_{R1}$ and a second switch signal $S_{R2}$. The second switch signal $S_{R2}$ controls the second switch 14 to disconnect the AC power source Vac supplying power to the load 90 when the voltage detection circuit 123 detects that the DC voltage Vb reaches to a first over voltage value Voth1. Furthermore, the first switch signal $S_{R1}$ controls the switch assembly 121 to provide the voltage-limiting and current-limiting protections when the voltage detection circuit 123 detects that the DC voltage Vb continuously increases to reach to a second over voltage value Voth2. The detailed operation of the over-voltage protection apparatus 10 will be described hereinafter as follows.

Figure 4A:
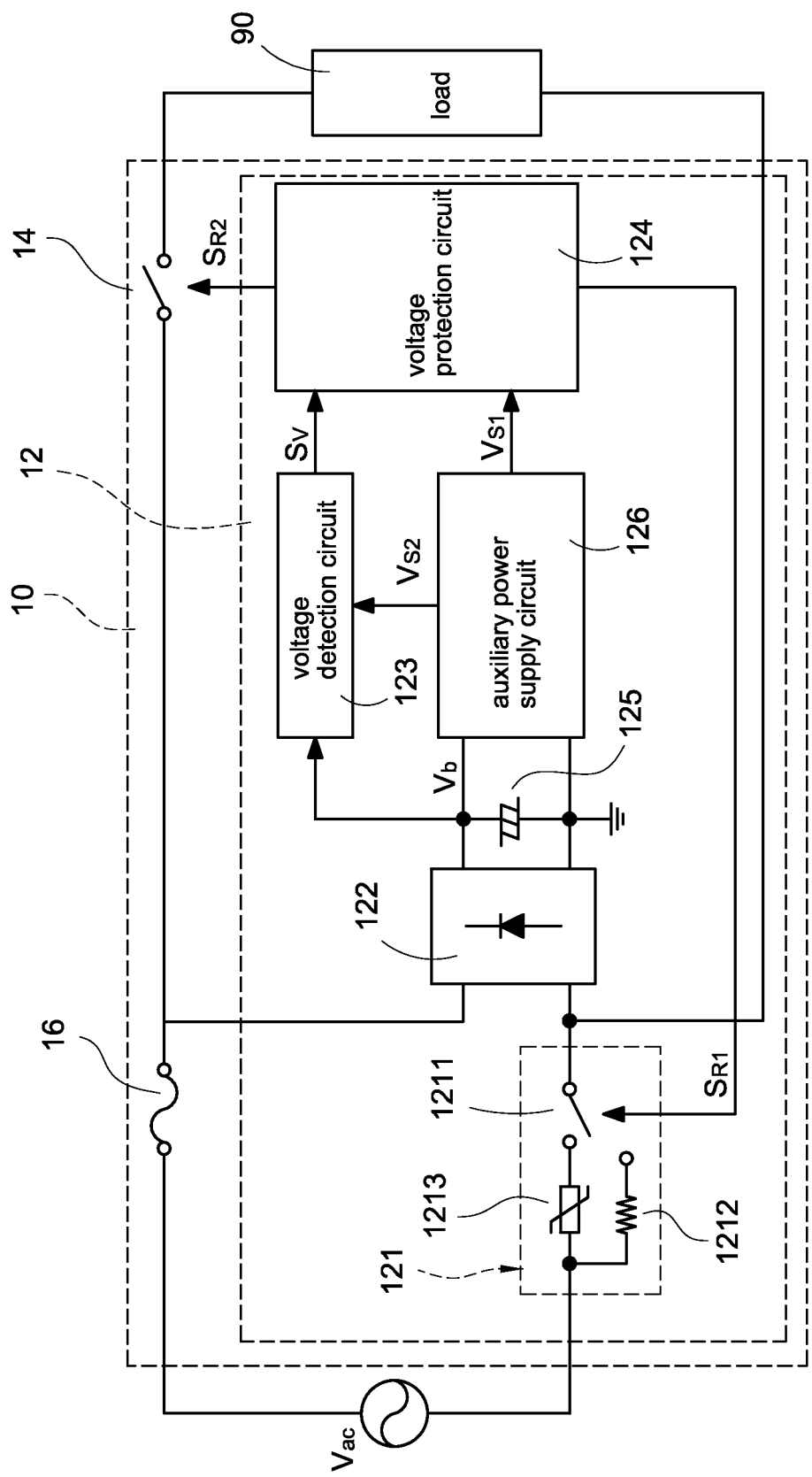
FIG. 4A is a circuit block diagram of the over-voltage protection apparatus according to a first embodiment of the present disclosure.

Reference is made to FIG. 4A which is a circuit block diagram of the over-voltage protection apparatus according to a first embodiment of the present disclosure. As mentioned above, the switch assembly 121 mainly includes a first switch 1211, a resistor 1212, and a negative temperature coefficient (NTC) element 1213. Especially, different circuit topologies of the switch assembly 121 are designed for different rear-end loads or electrical devices to implement the over-voltage protection. In particular, the first switch 1211 can be a relay switch, but not limited.

As shown in FIG. 4A, the first switch 1211 is a three-terminal element with a first terminal, a second terminal, and a common terminal. The resistor 1212 and the NTC element 1213 are both two-terminal elements with a first terminal and a second terminal. The common terminal of the first switch 1211 is connected to the input terminal of the rectifying circuit 122, the first terminal of the first switch 1211 is connected to the second terminal of the NTC element 1213, and the second terminal of the first switch 1211 is connected to the second terminal of the resistor 1212. In particular, the first switch 1211 is controlled by the first switch signal $S_{R1}$ generated from the voltage protection circuit 124. The first terminal of the NTC element 1213 is connected to the first terminal of the resistor 1212 and then connected to the AC power source Vac.

Figure 4B:
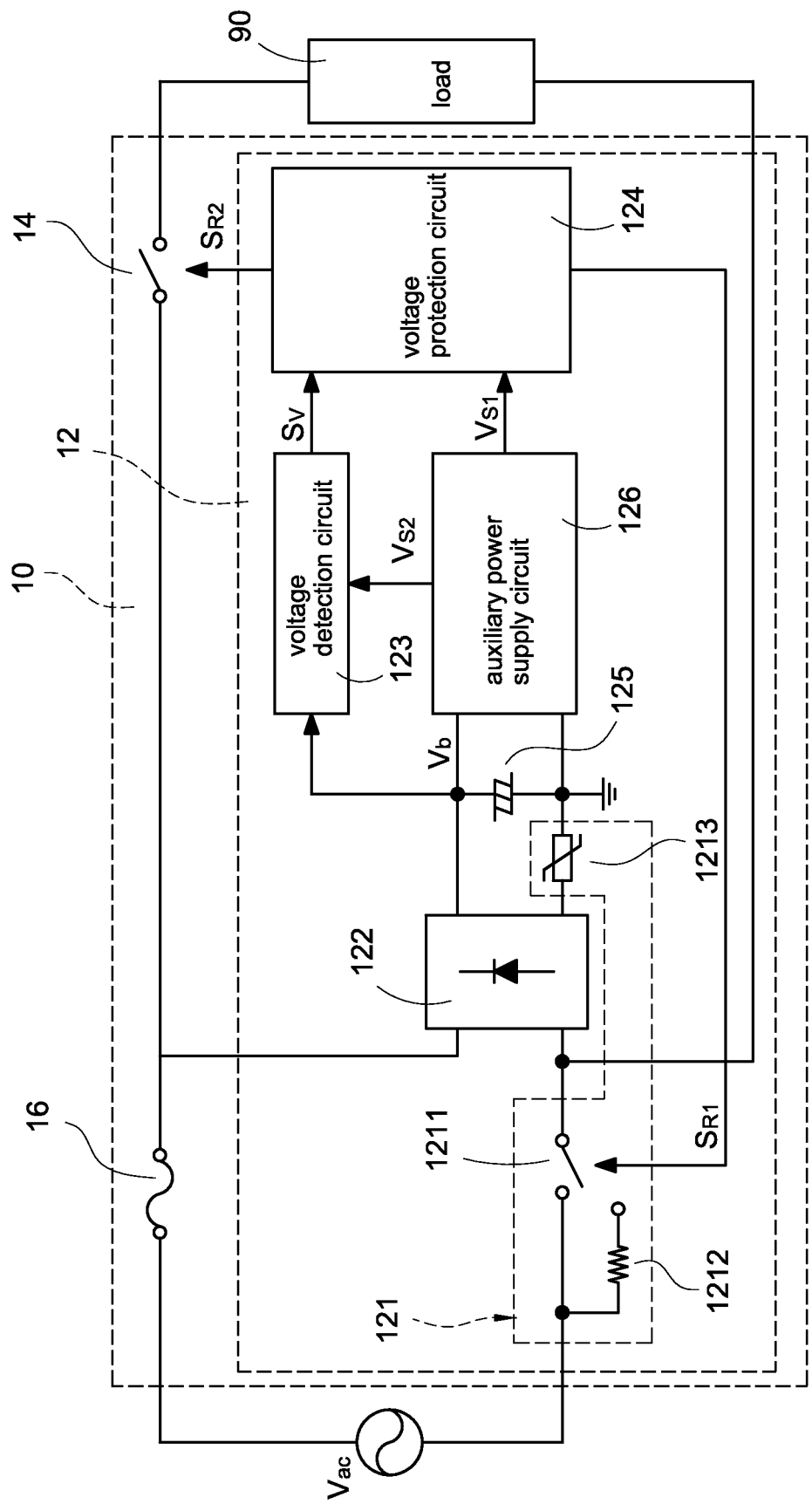
FIG. 4B is a circuit block diagram of the over-voltage protection apparatus according to a second embodiment of the present disclosure.

Reference is made to FIG. 4B which is a circuit block diagram of the over-voltage protection apparatus according to a second embodiment of the present disclosure. As shown in FIG. 4B, the first switch 1211 is a three-terminal element with a first terminal, a second terminal, and a common terminal. The resistor 1212 and the NTC element 1213 are both two-terminal elements with a first terminal and a second terminal. The common terminal of the first switch 1211 is connected to the input terminal of the rectifying circuit 122, the first terminal of the first switch 1211 is connected to the first terminal of the resistor 1212 and the AC power source Vac, and the second terminal of the first switch 1211 is connected to the second terminal of the resistor 1212. In particular, the first switch 1211 is controlled by the first switch signal $S_{R1}$ generated from the voltage protection circuit 124. The first terminal of the NTC element 1213 is connected to the output terminal of the rectifying circuit 122 and the second terminal of the NTC element 1213 is connected to the main capacitor 125.

Figure 4C:
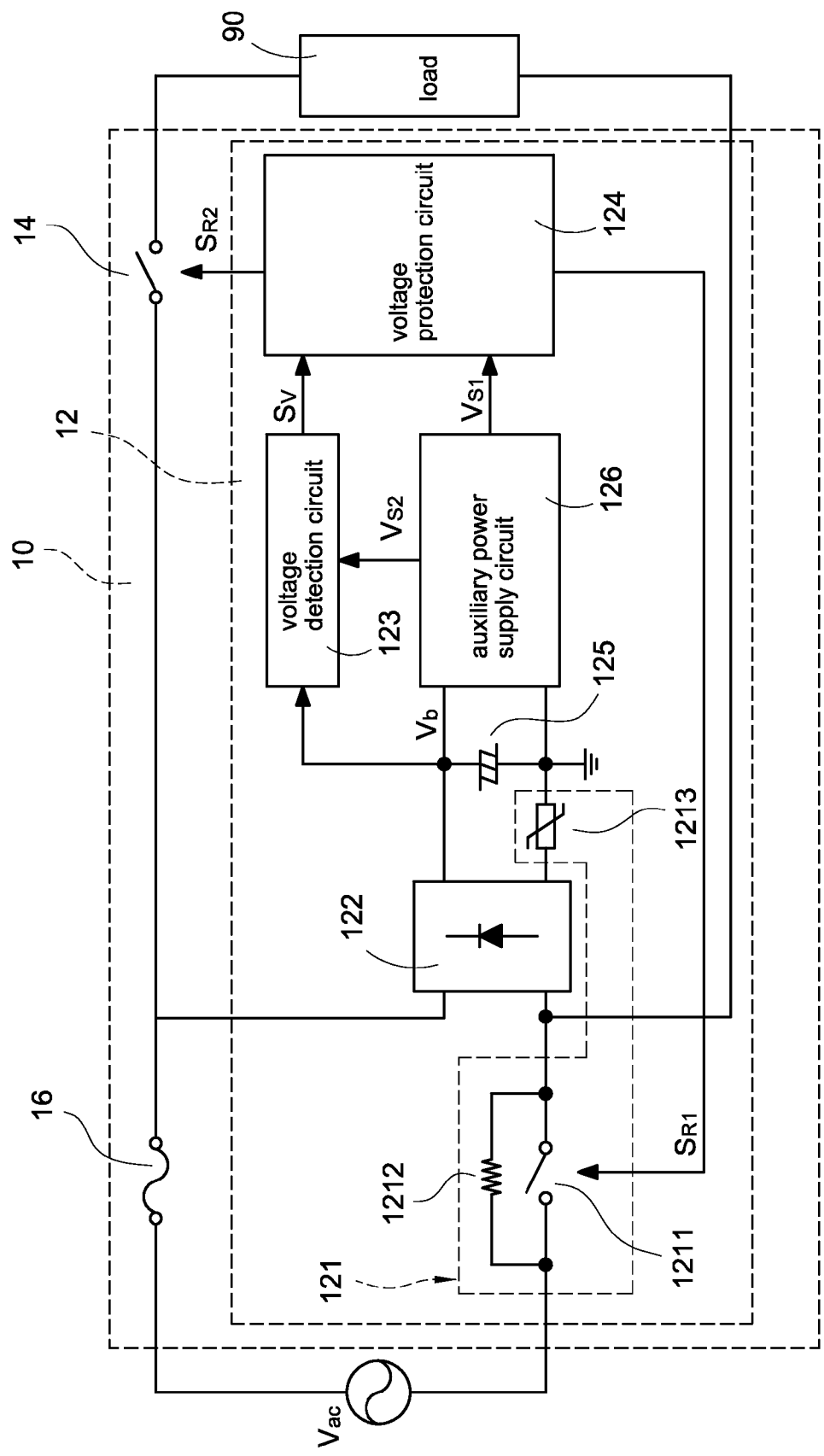
FIG. 4C is a circuit block diagram of the over-voltage protection apparatus according to a third embodiment of the present disclosure.

Reference is made to FIG. 4C which is a circuit block diagram of the over-voltage protection apparatus according to a third embodiment of the present disclosure. As shown in FIG. 4C, the first switch 1211, the resistor 1212, and the NTC element 1213 are all two-terminal elements with a first terminal and a second terminal. The first terminal of the first switch 1211 is connected to the second terminal of the resistor 1212 and the input terminal of the rectifying circuit 122, the second terminal of the first switch 1211 is connected to the first terminal of the resistor 1212 and the AC power source Vac. In particular, the first switch 1211 is controlled by the first switch signal $S_{R1}$ generated from the voltage protection circuit 124. The first terminal of the NTC element 1213 is connected to the output terminal of the rectifying circuit 122 and the second terminal of the NTC element 1213 is connected to the main capacitor 125.

Reference is made to FIG. 5 which is a schematic waveform of operating the over-voltage protection according to the present disclosure. The waveforms illustrated from top to down are the AC power source Vac, the DC voltage Vb, the first switch signal $S_{R1}$, and the second switch signal $S_{R2}$, respectively. As shown in FIG. 3, the voltage detection circuit 123 detects that the DC voltage Vb is constant because the AC power source Vac normally supplies power at the time point t0. It is assumed that the AC power source Vac abnormally increases at the time point t1. Hence, the voltage across the main capacitor 125, namely the DC voltage Vb gradually increases. At the time point t2, the voltage detection circuit 123 detects that the DC voltage Vb reaches to the first over voltage value Voth1 set by the input voltage detection module 12. Hence, the voltage protection circuit 124 outputs the low-level second switch signal $S_{R2}$ to turn off the second switch 14, thereby disconnecting the AC power source Vac to supply the load 90. Accordingly, it is to avoid damaging the rear-end load 90 or electrical devices due to the abnormal high voltage of the AC power source Vac.

In this embodiment, in addition, the AC power source Vac abnormally increases. At the time point t3, the voltage detection circuit 123 detects that the DC voltage Vb reaches to the second over voltage value Voth2 set by the input voltage detection module 12. Hence, the voltage protection circuit 124 outputs the low-level first switch signal $S_{R1}$ to turn off the switch assembly 121, thereby providing the voltage-limiting and current-limiting protections.

At the time point t4, the AC power source Vac recovers to normally supply power. The voltage protection circuit 124 outputs the high-level first switch signal $S_{R1}$ to turn on the switch assembly 121 when the voltage detection circuit 123 detects that the DC voltage Vb reduces to the second over voltage value Voth2. Also, the AC power source Vac continuously decreases. At the time point t5, the voltage protection circuit 124 outputs the high-level second switch signal $S_{R2}$ to turn on the second switch 14 when the voltage detection circuit 123 detects that the DC voltage Vb reduces to the first over voltage value Voth1. Accordingly, the switch assembly 121 and the second switch 14 are recovered to make the AC power source Vac normally supply power to the load 90.

Especially, the switch assembly 121 provides different embodiments for the voltage-limiting and current-limiting protections, and the detailed operations thereof are described hereinafter as follows.

See FIG. 4A again, when the AC power source Vac normally supplies power, the first switch signal $S_{R1}$ controls the first switch 1211: the first terminal of the first switch 1211 is connected to the common terminal of the first switch 1211 so that the AC power source Vac supplies power to the load 90 via the NTC element 1213. In particular, the NTC element 1213 is used for the protection of inrush current when the system starts up. When the DC voltage Vb reaches to the second over voltage value Voth2, the first switch signal $S_{R1}$ controls the first switch 1211: the second terminal of the first switch 1211 is connected to the common terminal of the first switch 1211 so that the AC power source Vac provides the voltage-limiting and current-limiting protections via the resistor 1212. At this condition, the resistor 1212 is used to be a current-limiting resistor to provide the current-limiting protection for the input voltage detection module 12, and also the resistor 1212 is used to be a voltage-dividing resistor to provide the voltage-limiting protection for the input voltage detection module 12.

See FIG. 4B again, when the AC power source Vac normally supplies power, the first switch signal $S_{R1}$ controls the first switch 1211: the first terminal of the first switch 1211 is connected to the common terminal of the first switch 1211 so that the AC power source Vac supplies power to the load 90 via the first switch 1211. In particular, the NTC element 1213 is used for the protection of inrush current when the system starts up. When the DC voltage Vb reaches to the second over voltage value Voth2, the first switch signal $S_{R1}$ controls the first switch 1211: the second terminal of the first switch 1211 is connected to the common terminal of the first switch 1211 so that the AC power source Vac provides the voltage-limiting and current-limiting protections via the resistor 1212. At this condition, the resistor 1212 is used to be a current-limiting resistor to provide the current-limiting protection for the input voltage detection module 12, and also the resistor 1212 is used to be a voltage-dividing resistor to provide the voltage-limiting protection for the input voltage detection module 12.

See FIG. 4C again, when the AC power source Vac normally supplies power, the first switch signal $S_{R1}$ controls the first switch 1211: the first terminal of the first switch 1211 is connected to the second terminal of the first switch 1211, namely the first switch 1211 is turned on so that the AC power source Vac supplies power to the load 90 via bypass of the first switch 1211. In particular, the NTC element 1213 is used for the protection of inrush current when the system starts up. When the DC voltage Vb reaches to the second over voltage value Voth2, the first switch signal $S_{R1}$ controls the first switch 1211: the first terminal of the first switch 1211 is disconnected to the second terminal of the first switch 1211 so that the AC power source Vac provides the voltage-limiting and current-limiting protections via the resistor 1212. At this condition, the resistor 1212 is used to be a current-limiting resistor to provide the current-limiting protection for the input voltage detection module 12, and also the resistor 1212 is used to be a voltage-dividing resistor to provide the voltage-limiting protection for the input voltage detection module 12.

Figure 6:
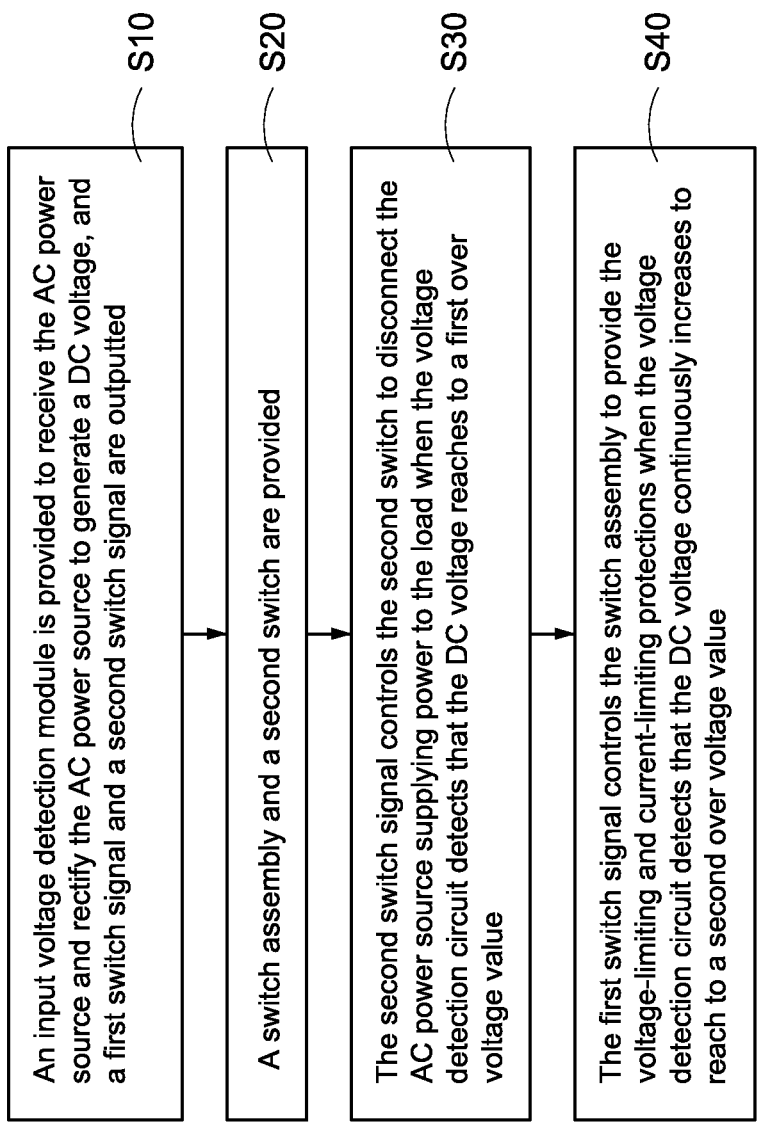
FIG. 6 is a flowchart of a method of operating an over-voltage protection apparatus according to the present disclosure.

Reference is made to FIG. 6 which is a flowchart of a method of operating an over-voltage protection apparatus according to the present disclosure. The over-voltage protection apparatus is connected between an AC power source and a load. The method includes the following steps. First, an input voltage detection module is provided to receive the AC power source and rectify the AC power source to generate a DC voltage, and a first switch signal and a second switch signal are outputted (S10).

Afterward, a switch assembly and a second switch are provided (S20). The input voltage detection module includes a switch assembly, a rectifying circuit, the voltage detection circuit, and a voltage protection circuit. An input terminal of the switch assembly is connected to one terminal of the AC power source. An input terminal of the rectifying circuit is connected to the other terminal of the AC power source and the switch assembly to receive the AC power source and rectify the AC power source to generate a DC voltage. The voltage detection circuit receives the DC voltage to output a voltage signal. The voltage protection circuit receives the voltage signal to output a first switch signal and a second switch signal.

In addition, the input voltage detection module further includes a main capacitor and an auxiliary power supply circuit. The main capacitor is connected in parallel to an output terminal of the rectifying circuit to receive the DC voltage and filter the DC voltage. The auxiliary power supply circuit is electrically connected to the main capacitor to receive the filtered DC voltage and converter the filtered DC voltage into a plurality of output DC voltages for providing the required power of circuits inside the input voltage detection module.

The second switch signal controls the second switch to disconnect the AC power source supplying power to the load when the voltage detection circuit detects that the DC voltage reaches to a first over voltage value (S30). Furthermore, the first switch signal controls the switch assembly to provide the voltage-limiting and current-limiting protections when the voltage detection circuit detects that the DC voltage continuously increases to reach to a second over voltage value (S40).

In conclusion, the present disclosure has following advantages:

1. The second switch 14 is controlled to disconnect the AC power source Vac supplying power to the load 90 when the voltage detection circuit 123 detects that the AC power source Vac is in an abnormal high voltage that is the DC voltage Vb reaches to the first over voltage value Voth1. Also, the switch assembly 121 is controlled to provide the voltage-limiting and current-limiting protections when the AC power source Vac continuously increases that is the DC voltage Vb reaches to the second over voltage value Voth2. Accordingly, the withstand voltage class of the resistor 1212 can be decreased to reduce circuit costs and extend life time of circuit components; and 2. The rated power of the resistor 1212 can be significantly reduced to miniaturize the over-voltage protection apparatus 10.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An over-voltage protection apparatus connected to an AC power source and a load, the apparatus comprising:
   an input voltage detection module, comprising:
   a switch assembly connected to one terminal of the AC power source;
   a rectifying circuit connected to the other terminal of the AC power source and the switch assembly, and configured to receive the AC power source and rectify the AC power source to generate a DC voltage;
   a voltage detection circuit configured to receive the DC voltage and output a voltage signal; and
   a voltage protection circuit configured to receive the voltage signal and output a first switch signal and a second switch signal; and
   a second switch connected to the AC power source, the load, and the input voltage detection module;
   wherein the second switch signal is configured to control the second switch to disconnect the AC power source supplying power to the load when the voltage detection circuit is configured to detect that the DC voltage reaches to a first over voltage value; the first switch signal is configured to control the switch assembly to provide a voltage-limiting protection and a current-limiting protection when the voltage detection circuit is configured to detect that the DC voltage increases to reach to a second over voltage value.

2. The over-voltage protection apparatus in claim 1, wherein the input voltage detection module further comprises:
   a main capacitor electrically connected to an output terminal of the rectifying circuit to receive the DC voltage and filter the DC voltage; and
   an auxiliary power supply circuit electrically connected to the main capacitor to receive the filtered DC voltage and convert the filtered DC voltage into a plurality of output DC voltages for providing the required power of circuits inside the input voltage detection module.

3. The over-voltage protection apparatus in claim 1, wherein the switch assembly comprises:
   a first switch having a first terminal, a second terminal, and a common terminal; the first switch is controlled by the first switch signal generated from the voltage protection circuit;
   a resistor having a first terminal and a second terminal; and
   a NTC element having a first terminal and a second terminal;
   wherein the common terminal of the first switch is connected to an input terminal of the rectifying circuit, the first terminal of the first switch is connected to the second terminal of the NTC element, and the second terminal of the first switch is connected to the second terminal of the resistor; the first terminal of the NTC element is connected to the first terminal of the resistor, and then is connected to the AC power source.

4. The over-voltage protection apparatus in claim 1, wherein the switch assembly comprises:
   a first switch having a first terminal, a second terminal, and a common terminal; the first switch is controlled by the first switch signal generated from the voltage protection circuit;
   a resistor having a first terminal and a second terminal; and
   a NTC element having a first terminal and a second terminal;
   wherein the common terminal of the first switch is connected to an input terminal of the rectifying circuit, the first terminal of the first switch is connected to the first terminal of the resistor, and the second terminal of the first switch is connected to the second terminal of the resistor; the first terminal of the NTC element is connected to an output terminal of the rectifying circuit, and the second terminal of the NTC element is connected to the main capacitor.

5. The over-voltage protection apparatus in claim 1, wherein the switch assembly comprises:
   a first switch having a first terminal and a second terminal; the first switch is controlled by the first switch signal generated from the voltage protection circuit;
   a resistor having a first terminal and a second terminal; and
   a NTC element having a first terminal and a second terminal;
   wherein the first terminal of the first switch is connected to the second terminal of the resistor and an input terminal of the rectifying circuit, and the second terminal of the first switch is connected to the first terminal of the resistor and the AC power source; the first terminal of the NTC element is connected to an output terminal of the rectifying circuit, and the second terminal of the NTC element is connected to the main capacitor.

6. The over-voltage protection apparatus in claim 3, wherein the first switch signal is configured to control the first switch so that the common terminal of the first switch is connected to the second terminal of the first switch when the DC voltage reaches to the second over voltage value which is set by the input voltage detection module, thereby the resistor is connected to the AC power source and the rectifying circuit to provide the voltage-limiting protection and the current-limiting protection.

7. The over-voltage protection apparatus in claim 4, wherein the first switch signal is configured to control the first switch so that the common terminal of the first switch is connected to the second terminal of the first switch when the DC voltage reaches to the second over voltage value which is set by the input voltage detection module, thereby the resistor is connected to the AC power source and the rectifying circuit to provide the voltage-limiting protection and the current-limiting protection.

8. The over-voltage protection apparatus in claim 5, wherein the first switch signal is configured to turn off the first switch when the DC voltage reaches to the second over voltage value which is set by the input voltage detection module, thereby the resistor is connected to the AC power source and the rectifying circuit to provide the voltage-limiting protection and the current-limiting protection.

9. The over-voltage protection apparatus in claim 1, further comprising:
   a fuse unit connected in series to the second switch to form a series branch, and the series branch electrically connected between the AC power source and the load; wherein the fuse unit is configured to interrupt excessive current flowing through the series branch when the AC power source supplies power to the load.

10. A method of operating an over-voltage protection apparatus, the over-voltage protection apparatus connected to an AC power source and a load, the method comprising:
   (a) providing an input voltage detection module to receive the AC power source and rectify the AC power source to generate a DC voltage, and outputting a first switch signal and a second switch signal;
   (b) providing a switch assembly and a second switch;
   (c) controlling the second switch by the second switch signal to disconnect the AC power source supplying power to the load when the voltage detection circuit detects that the DC voltage reaches to a first over voltage value; and
   (d) controlling the switch assembly by the first switch signal to provide a voltage-limiting protection and a current-limiting protection when the voltage detection circuit detects that the DC voltage continuously increases to reach to a second over voltage value.

11. The method of operating the over-voltage protection apparatus in claim 10, wherein the input voltage detection module comprises:
   the switch assembly connected to one terminal of the AC power source;
   a rectifying circuit connected to the other terminal of the AC power source and the switch assembly, and configured to receive the AC power source and rectify the AC power source to generate a DC voltage;
   the voltage detection circuit configured to receive the DC voltage and output a voltage signal; and
   a voltage protection circuit configured to receive the voltage signal and output the first switch signal and the second switch signal.

12. The method of operating the over-voltage protection apparatus in claim 11, wherein the input voltage detection module further comprises:
   a main capacitor electrically connected to an output terminal of the rectifying circuit to receive the DC voltage and filter the DC voltage; and
   an auxiliary power supply circuit electrically connected to the main capacitor to receive the filtered DC voltage and convert the filtered DC voltage into a plurality of output DC voltages for providing the required power of circuits inside the input voltage detection module.

13. The method of operating the over-voltage protection apparatus in claim 10, wherein the switch assembly comprises:

a first switch having a first terminal, a second terminal, and a common terminal; the first switch is controlled by the first switch signal generated from the voltage protection circuit;
a resistor having a first terminal and a second terminal; and
a NTC element having a first terminal and a second terminal;
wherein the common terminal of the first switch is connected to an input terminal of the rectifying circuit, the first terminal of the first switch is connected to the second terminal of the NTC element, and the second terminal of the first switch is connected to the second terminal of the resistor; the first terminal of the NTC element is connected to the first terminal of the resistor, and then is connected to the AC power source.

14. The method of operating the over-voltage protection apparatus in claim 10, wherein the switch assembly comprises:
   a first switch having a first terminal, a second terminal, and a common terminal; the first switch is controlled by the first switch signal generated from the voltage protection circuit;
   a resistor having a first terminal and a second terminal; and
   a NTC element having a first terminal and a second terminal;
   wherein the common terminal of the first switch is connected to an input terminal of the rectifying circuit, the first terminal of the first switch is connected to the first terminal of the resistor, and the second terminal of the first switch is connected to the second terminal of the resistor; the first terminal of the NTC element is connected to an output terminal of the rectifying circuit, and the second terminal of the NTC element is connected to the main capacitor.

15. The method of operating the over-voltage protection apparatus in claim 10, wherein the switch assembly comprises:
   a first switch having a first terminal and a second terminal; the first switch is controlled by the first switch signal generated from the voltage protection circuit;
   a resistor having a first terminal and a second terminal; and
   a NTC element having a first terminal and a second terminal;
   wherein the first terminal of the first switch is connected to the second terminal of the resistor and an input terminal of the rectifying circuit, and the second terminal of the first switch is connected to the first terminal of the resistor and the AC power source; the first terminal of the NTC element is connected to an output terminal of the rectifying circuit, and the second terminal of the NTC element is connected to the main capacitor.

16. The method of operating the over-voltage protection apparatus in claim 13, wherein the first switch signal is configured to control the first switch so that the common terminal of the first switch is connected to the second terminal of the first switch when the DC voltage reaches to the second over voltage value which is set by the input voltage detection module, thereby the resistor is connected to the AC power source and the rectifying circuit to provide the voltage-limiting protection and the current-limiting protection.

17. The method of operating the over-voltage protection apparatus in claim 14, wherein the first switch signal is configured to control the first switch so that the common terminal of the first switch is connected to the second terminal of the first switch when the DC voltage reaches to the second over voltage value which is set by the input voltage detection module, thereby the resistor is connected to the AC power source and the rectifying circuit to provide the voltage-limiting protection and the current-limiting protection.

18. The method of operating the over-voltage protection apparatus in claim 15, wherein the first switch signal is configured to turn off the first switch when the DC voltage reaches to the second over voltage value which is set by the input voltage detection module, thereby the resistor is connected to the AC power source and the rectifying circuit to provide the voltage-limiting protection and the current-limiting protection.

19. The method of operating the over-voltage protection apparatus in claim 10, further comprising:
    providing a fuse unit, the fuse unit connected in series to the second switch to form a series branch, and the series branch electrically connected between the AC power source and the load; wherein the fuse unit is configured to interrupt excessive current flowing through the series branch when the AC power source supplies power to the load.

* * * * *